United States Patent [19]

Freeman et al.

[11] 4,445,956

[45] May 1, 1984

[54] METHOD AND MATERIAL FOR SECURING STRUCTURE FOR MACHINING

[75] Inventors: Bob L. Freeman; Peter W. Borris, both of Pleasanton, Calif.

[73] Assignee: Hexcel Corporation, San Francisco, Calif.

[21] Appl. No.: 466,178

[22] Filed: Feb. 14, 1983

[51] Int. Cl.³ .................... B23P 17/00; B32B 5/02; B32B 7/12

[52] U.S. Cl. ..................... 156/154; 29/423; 29/424; 156/247; 269/7; 428/138; 428/147; 428/285; 428/287; 428/339; 428/354

[58] Field of Search ............ 428/138, 247, 285, 287, 428/354, 339; 269/7; 29/423, 424; 156/154, 247

[56] References Cited

U.S. PATENT DOCUMENTS

| | | | |
|---|---|---|---|
| 2,855,664 | 10/1958 | Griffith et al. | 269/7 |
| 2,905,064 | 9/1959 | Nielsen | 29/423 |
| 2,937,437 | 5/1960 | Cole et al. | 269/7 |
| 3,046,175 | 7/1962 | Bowman | 29/424 |
| 3,065,345 | 11/1962 | Herman et al. | 29/423 |
| 3,093,370 | 6/1963 | May et al. | 29/424 |
| 3,176,387 | 4/1965 | Argueso et al. | 29/423 |
| 3,413,708 | 12/1968 | Norville et al. | 29/424 |
| 3,513,065 | 5/1970 | Pearson | 428/247 |
| 3,733,239 | 5/1973 | George | 428/247 |
| 4,316,926 | 2/1982 | Kaminstein | 428/247 |

Primary Examiner—James C. Cannon
Attorney, Agent, or Firm—John L. McGannon

[57] ABSTRACT

An improved method and material for securing a thin-edged deformable structure, such as a honeycomb core, so that the structure may be machined while it is in a generally stabilized condition. The material is a laminate which is bonded to one side of the structure to be machined. The laminate is then secured by vacuum and the structure is then machined in a desired manner. The laminate includes a first stabilizing layer formed from a mesh of fiberglass, nylon or the like and having relative large openings. The mesh is impregnated with a suitable epoxy or phenolic resin which acts as an adhesive to secure the mesh to the structure. A fabric of nylon or the like is applied over the mesh and bonded thereto. A third and final layer includes a non-porous plastic sheet which permits the laminate to adhere by suction to a vacuum chuck. After machining, the fabric and non-porous layers are removed, leaving the open mesh layer fixed to the structure to stabilize it.

16 Claims, 3 Drawing Figures

METHOD AND MATERIAL FOR SECURING STRUCTURE FOR MACHINING

FIELD OF THE INVENTION

This invention is directed to sheet material for securing and protecting parts during machining, processing and shipment.

BACKGROUND OF THE INVENTION

Temporary coatings or material layers have been used to hold and protect parts, especially delicate and easily deformable parts such as honeycomb cores, during machining, processing and shipment. Such a protective layer must have sufficient adhesion to the part so that the layer will not be readily peeled away or removed from the part during handling, but yet it may be removed easily and completely after machining processing or shipment of the part is complete.

In the aerospace field, structural honeycomb has many applications and often must be machined to close tolerances to form intricate contours. Such machining is difficult or impossible to accomplish unless the thin-walled honeycomb core is in some manner supported or rigidly stabilized.

To stabilize honeycomb for machining, use has previously been made of significant quantities of a compound containing mixtures of certain synthetic water-soluble waxes, mica, fiberglass and alkali metal carbonates which solidify at low temperatures and are suitable for removal by water or acid washing as disclosed in U.S. Pat. No. 3,176,387. This patent teaches that the entire volume of the voids of a honeycomb core are filled with the compound before machining. Such waxes are generally made of polyethylene glycol but suffer from the disadvantage that, even through the waxes are water soluble and may be removed by water, without a thorough cleaning of the entire structure, a wax residue remains on the core. This residue, if not removed, prevents proper adhesive bonding generally required in later manufacturing operations using the honeycomb itself. Also, the polyglycol is not suitable for use with non-metallic cores such as fiberglass or Nomex. It also should not be used on parts which are spliced with foam adhesive since it cannot be readily removed from the pores of the foam. Thorough cleaning of the surface with water to permit complete removal of all of the wax is wasteful of natural resources and is generally not economical.

In U.S. Pat. No. 3,064,345, a temporary air-tight layer is disclosed in which the layer is obtained by using a resin layer within cellular material so that the material may be more readily secured in place for shaping or machining. The patent teaches that, when molten polyglycol wax is poured into heated perchloroethylene, two layers are formed with the polyglycol layer being on top. The cellular structure is placed in the heated liquid bath and allowed to settle to the desired level. Upon cooling, the polyglycol wax solidifies to provide a rigid air-tight chamber in the cellular structure which enables the structure to be held for machining. The polyglycol wax is then removed by immersion in or spraying with water.

Since the method of U.S. Pat. No. 3,064,345 uses perchloroethylene, a chlorinated hydrocarbon solvent, the method must be performed carefully to avoid fire hazards. Moreover, the method in this patent would appear to be suitable for use only with relatively small cellular structures.

In U.S. Pat. No. 2,905,064, it has been proposed to stabilize honeycomb with ice. In addition, U.S. Pat. No. 3,413,708 disclosed the use of ice in combination with a plurality of pressure pads to permit the machining of more than one structural surface. Although the use of ice has been successful in stabilizing thin-walled honeycomb during machining, the time required to freeze the ice and to thereafter re-freeze it for additional machining operations, as well as the formation of distortion which may be caused by thermal expansion or contractions during the freezing and thaw cycles, make it difficult to use ice to maintain required tolerances for various honeycomb parts.

U.S. Pat. No. 3,046,175 discloses a method of chemical forming of a honeycomb core. The honeycomb structure is inserted into a rubber-like coating material and then cured. The open cells of the honeycomb are then completely filled with a hot melt composition, followed by chemical etching using an acid solution in which the exposed core material is removed. The protective material is then mechanically removed. This method is very time consuming and requires the use of large quantities of hazardous, strongly acidic solutions.

Additional techniques which have been used to hold structural material for machining purposes are disclosed in U.S. Pat. Nos. 2,855,664, 2,937,437, 3,003,002 and 3,093,370.

In the handling of thin walled structures such as honeycomb cores, it is often necessary or desirable to avoid the application of heat to such structures because of adverse physical effects thereon. At elevated temperatures, the adhesive bonding between the cell structures of a honeycomb core may soften and cause significant deformation of the structure. Thus, in the preparation of honeycomb for machining using a thermoplastic resin, elevated curing temperatures of 350° F. coupled with extended curing times for the resin must be avoided. Moreover, it does not adhere well to a honeycomb structure. Other thermoplastic resins and waxes have been used but they generally suffer from the disadvantage that they may be corrosive to the metal structure or the residue can be removed only by the use of extensive cleaning with the use of water, acid solutions or organic solvents.

SUMMARY OF THE INVENTION

The present invention provides a improved method and bonding material for use in securing honeycomb core or other thin-walled deformable structure to a vacuum chuck or other support for machining. The material comprises a laminate which provides dimensional stability and is applied to one side of the honeycomb core and the laminate is coupled to a vacuum chuck so that the honeycomb core can be held to the chuck and thereafter machined in a desired manner.

The laminate includes three layers. A first layer is a stabilizing layer formed from a mesh of relatively large openings. The mesh can be of fiberglass, nylon or other suitable material. The mesh is impregnated with a suitable epoxy or phenolic resin which acts as an adhesive to secure the mesh to one side of the core.

A second fabric layer such as nylon or the like, may be applied to the outer surface of the first layer, depending upon the application, after the first layer has been applied to one side of the core. The second, fabric layer absorbs excess resin from the first layer and is bonded to the first layer.

A third and final layer is applied to the outer surface of the fabric layer. The third layer is a non-porous plastic sheet or skin which permits the pulling of a vacuum on the laminate with the honeycomb core applied thereto. The third layer is formed from any suitable non-porous material, such as Mylar or the like.

With the laminate applied to the honeycomb core as described above, the core can be mounted in a vacuum chuck and then machined to the desired tolerances and the desired configuration. After machining, the second and third layers of the laminate are removed from the first layer, and the first layer is left on the honeycomb core to stabilize it yet the openings in the first layer permit the particles left in the honeycomb cells by machining to be blown or otherwise removed from the honeycomb core cells to make the honeycomb structure ready for immediate use or futher handling. By proper control of resin content, the first layer can also be removed, with a minimum residue of cured resin remaining on the honeycomb core surface.

The primary object of the present invention is to provide an improved method and material for use in mounting and stabilizing a thin-walled deformable structure, such as honeycomb core, so that the structure can be readily machined and the material can, for the most part, thereafter be removed from the structure yet the machined structure remains stabilized by a part of the material so that it can be further handled or shipped for ultimate use as a component of an overall assembly.

Other objects of this invention will become apparent as the following specification progresses, reference being had to the accompanying drawing which illustrates a preferred embodiment of the material of the present invention and the way it is applied to honeycomb core.

IN THE DRAWING

Figure 1:
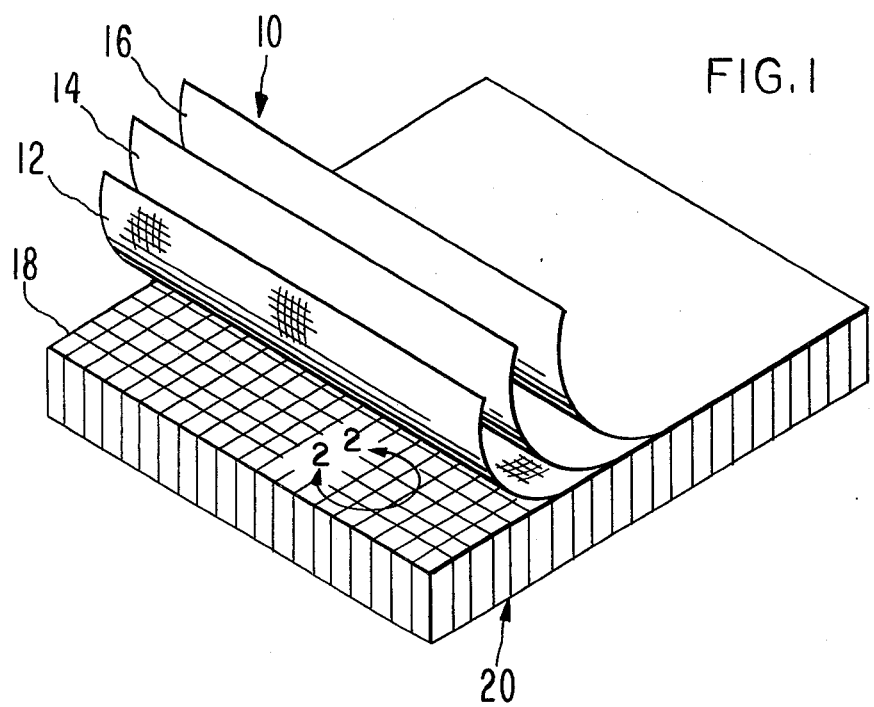
FIG. 1 is a perspective view of the material of the present invention for securing a honeycomb core to a vacuum chuck or other support for machining, the material being shown in layers as laminate on one side of a honeycomb core.

The material of the present invention comprises a laminate 10 formed from three layers 12, 14 and 16. Laminate 10 is adapted to be placed on one side 18 of a honeycomb core 20 or other thin-walled deformable structure. When the laminate is on the honeycomb core, the assembly can be placed on a vacuum chuck 22 or other support with the outer support of the laminate in engagement with the chuck. Then, a vacuum can be pulled by the chuck to cause the honeycomb core 20 to be ridigly connected thereto. The honeycomb core can be machined to close tolerances to provide a specific configuration therefor.

Figure 3:
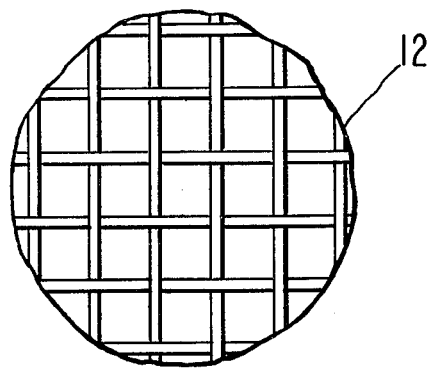
FIG. 3 is a fragmentary plan view of the first layer of the material, showing the openings therein.
Figure 2:
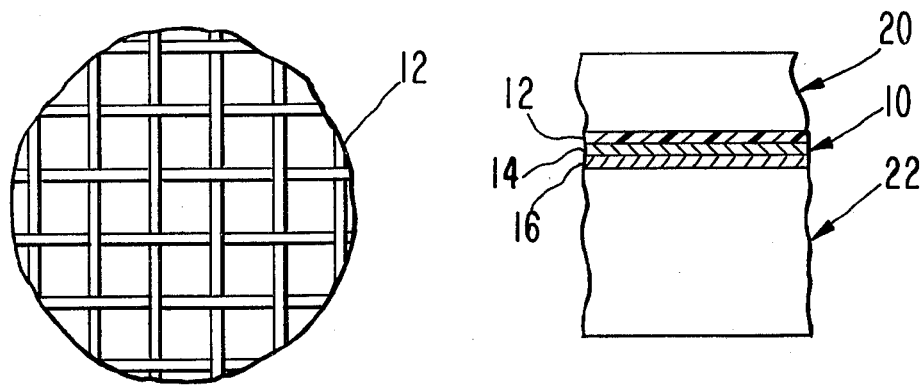
FIG. 2 is a fragmentary side elevational view of the material on the honeycomb core, the material thickness being slightly exaggerated to illustrate the way it is bonded to one side of the honeycomb core.

The first layer 12 is a stabilizing layer formed from a mesh having relatively large openings as shown in FIG. 3. The openings are generally square and are typically 0.100-inch on a side although the side dimension can be greater or less than this value. The material of layer 12 can be fiberglass, nylon or other suitable material. Layer 12 is impregnated with a suitable epoxy or phenolic resin which acts as adhesive to secure layer 12 to one side 18 of honeycomb core 20. The layer 12 typically is pre-impregnated with epoxy or resin and then applied to side 18.

Second layer 14 comprises a fabric sheet, such as of nylon or the like, which is applied over layer 12 after layer 12 has been applied to side 18. The fabric material of layer 14 absorbs excess epoxy or resin from layer 12.

The third and final layer is a non-porous plastic sheet or skin which permits the pulling of a vacuum on the laminate. Layer 16 can be of any suitable material, such as Mylar film. Layer 16 is applied to layer 14 and is bonded to layer 14 by virtue of the fact that layer 14 has absorbed excess resin from layer 12 and this excess resin bonds layers 14 and 16 together.

With the laminate 10 bonded to one side 18 of honeycomb core 20, the laminate can be coupled to vacuum chuck 22 and a vacuum can be pulled to mount honeycomb core 20 on the chuck. Then the honeycomb core is machined as desired. After machining, layers 14 and 16 are peeled off layer 12, and layer 12 remains on one side 18 to stabilize the machined honeycomb core and to leave relatively large openings on side 18. These openings permit air under pressure or other suitable means to be used to force particles resulting from machining out of the cells. Following the machining operations and the cleaning of the cells of the honeycomb core, the honeycomb core is now ready to be further processed or shipped for ultimate use as a component of a completed assembly. Alternatively, layer 12 can also be removed.

What is claimed is:

1. A laminate for securing a structure for machining comprising: an assembly adapted to be secured to one side of the structure, said assembly including a first layer of perforate material impregnated with an adhesive, said first layer adapted to be bonded by the adhesive to one side of the structure, a second layer of fabric material bonded by the adhesive to the first layer, and a third layer of non-porous material bonded to the second layer, the structure adapted to be mounted by the assembly on a vacuum chuck for machining of the structure when the assembly is on said one side of the structure.

2. A laminate as set forth in claim 1, wherein the material of the first layer is fiberglass.

3. A laminate as set forth in claim 1, wherein the material of the first layer is nylon.

4. A laminate as set forth in claim 1, wherein the material of the second layer is nylon.

5. A laminate as set forth in claim 1, wherein the material of the third layer is a non-porous plastic.

6. A laminate as set forth in claim 5, wherein said plastic is synthetic linear polyester.

7. A laminate as set forth in claim 1, wherein said first layer has a plurality of openings therethrough to form a mesh, the second layer being separable from the mesh.

8. A laminate as set forth in claim 6, wherein the openings are square and have a dimension of 0.100-inch on a side.

9. A laminate as set forth in claim 1, wherein the second and third layers are separable from the first layer, said first layer having a strength capable of providing stability for the structure when the structure is deformable.

10. A method of securing a deformable structure to a support for handling comprising: bonding a laminate to one side of the structure with the laminate having a first layer of perforate material in engagement with the one side of the structure, a second layer of fabric material bonded by adhesive to the first layer, and a third layer of non-porous material coupled to the second layer; holding the assembly of the structure and the laminate on a support to permit processing of the structure; removing the assembly from the support; and separating the second layer from the first layer while the first layer remains bonded to said one side of the structure to stabilize the latter.

11. A method as set forth in claim 10, wherein the structure is a honeycomb core.

12. A method as set forth in claim 10, wherein said first layer is a fiberglass mesh.

13. A method as set forth in claim 10, wherein the first layer is nylon mesh.

14. A method as set forth in claim 10, wherein the third layer is a non-porous plastic material.

15. A method as set forth in claim 14, wherein said plastic is synthetic linear polyester.

16. A method as set forth in claim 10, wherein the first layer has square openings which have a dimension of 0.100-inch on a side.

* * * * *